United States Patent
Nigrin et al.

(10) Patent No.: US 9,664,165 B2
(45) Date of Patent: May 30, 2017

(54) PLUG-IN PUMP FOR A COMMON-RAIL SYSTEM AND ENGINE ARRANGEMENT HAVING AN INTERNAL COMBUSTION ENGINE, HAVING A COMMON-RAIL SYSTEM AND HAVING A PLUG-IN PUMP

(71) Applicant: Continental Automotive GmbH, Hannover (DE)

(72) Inventors: Uwe Nigrin, Ilmenau (DE); Ngoc-Tam Vu, Ludwigsburg (DE); Andreas Ederer, Walderbach (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/758,278

(22) PCT Filed: Oct. 9, 2014

(86) PCT No.: PCT/EP2014/071676
§ 371 (c)(1),
(2) Date: Jun. 29, 2015

(87) PCT Pub. No.: WO2015/052289
PCT Pub. Date: Apr. 16, 2015

(65) Prior Publication Data
US 2016/0208758 A1    Jul. 21, 2016

(30) Foreign Application Priority Data
Oct. 11, 2013   (DE) .................. 10 2013 220 600

(51) Int. Cl.
*F02M 37/04*    (2006.01)
*F02M 59/02*    (2006.01)
(Continued)

(52) U.S. Cl.
CPC .......... *F02M 59/027* (2013.01); *F02M 31/20* (2013.01); *F02M 37/043* (2013.01);
(Continued)

(58) Field of Classification Search
CPC .... F02M 31/20; F02M 37/041; F02M 37/043; F02M 37/045; F02M 37/046;
(Continued)

(56) References Cited

U.S. PATENT DOCUMENTS 4,630,587 A * 12/1986 Hofer ................ F02M 55/00
123/467
5,415,533 A * 5/1995 Egger ................ F02M 39/00
123/90.5

(Continued)

FOREIGN PATENT DOCUMENTS

CN    1573079 A    2/2005 ............ F02M 37/10
CN    1576569 A    2/2005 ............ F02M 37/08
(Continued)

OTHER PUBLICATIONS

International Search Report and Written Opinion, Application No. PCT/EP2014/071676, 18 pages, Jan. 14, 2015.
(Continued)

*Primary Examiner* — Erick Solis
(74) *Attorney, Agent, or Firm* — Slayden Grubert Beard PLLC

(57) ABSTRACT

A plug-in pump for a common-rail system has a pump housing having a cylinder formed therein and a piston guided in the cylinder, a fuel inlet, and a fuel outlet. The pump housing also includes a plug-in section for inserting the pump housing into an opening of an engine component, and a flange that delimits the plug-in section, for fastening the pump housing to the engine component. To cool the plug-in pump, the pump housing has at least one flow duct
(Continued)

with a separate fluid inlet and a separate fluid outlet. The fluid inlet is connectable to a fluid-discharging line of the internal combustion engine, and the fluid outlet is connectable to a fluid-receiving line of the internal combustion engine.

12 Claims, 1 Drawing Sheet

(51) Int. Cl.
| | |
|---|---|
| *F02M 53/04* | (2006.01) |
| *F02M 53/00* | (2006.01) |
| *F04B 53/08* | (2006.01) |
| *F04B 53/16* | (2006.01) |
| *F02M 31/20* | (2006.01) |
| *F02M 39/00* | (2006.01) |
| *F02M 41/16* | (2006.01) |
| *F02M 55/00* | (2006.01) |
| *F02M 55/02* | (2006.01) |
| *F02M 59/06* | (2006.01) |
| *F02M 59/10* | (2006.01) |

(52) U.S. Cl.
CPC .......... *F02M 39/005* (2013.01); *F02M 41/16* (2013.01); *F02M 53/00* (2013.01); *F02M 53/043* (2013.01); *F02M 55/005* (2013.01); *F02M 55/025* (2013.01); *F04B 53/08* (2013.01); *F04B 53/16* (2013.01); *F02M 59/025* (2013.01); *F02M 59/06* (2013.01); *F02M 59/102* (2013.01)

(58) Field of Classification Search
CPC ...... F02M 37/06; F02M 39/02; F02M 53/043; F02M 59/027; F02M 59/102
USPC ........... 123/41.31, 41.33, 254, 507–509, 541
See application file for complete search history.

(56) References Cited

U.S. PATENT DOCUMENTS

| | | | | |
|---|---|---|---|---|
| 5,603,303 | A | 2/1997 | Okajima et al. | 123/508 |
| 5,626,121 | A * | 5/1997 | Kushida | F02M 39/00 |
| | | | | 123/41.31 |
| 6,016,785 | A * | 1/2000 | Divecha | F02B 19/1004 |
| | | | | 123/254 |
| 6,840,219 | B2 | 1/2005 | Joos et al. | 123/456 |
| 7,195,466 | B2 | 3/2007 | Kobayashi et al. | 417/423.7 |
| 2003/0029423 | A1 | 2/2003 | Boehland et al. | 123/450 |
| 2009/0110575 | A1* | 4/2009 | Munakata | B23K 11/16 |
| | | | | 417/437 |
| 2010/0043760 | A1* | 2/2010 | Crofts | F02M 59/102 |
| | | | | 123/541 |
| 2010/0047084 | A1 | 2/2010 | Hokkanen | 417/213 |
| 2011/0223040 | A1* | 9/2011 | Lingener | F02D 41/3854 |
| | | | | 417/205 |
| 2012/0325179 | A1* | 12/2012 | Herold | F01P 3/12 |
| | | | | 123/254 |
| 2016/0032879 | A1* | 2/2016 | Flo | F04B 1/0404 |
| | | | | 123/195 A |

FOREIGN PATENT DOCUMENTS

| | | | | |
|---|---|---|---|---|
| CN | 101109377 A | 1/2008 | | F04B 53/00 |
| DE | 19515191 A1 | 11/1995 | | F01L 1/04 |
| DE | 19957742 A1 | 6/2001 | | F01P 1/06 |
| DE | 10139054 C1 | 1/2003 | | F02D 41/14 |
| DE | 102008001856 A1 | 11/2009 | | F02M 59/02 |
| DE | 102008002195 A1 | 12/2009 | | F02M 59/10 |
| DE | 102010031185 A1 | 1/2012 | | F02M 59/44 |
| JP | 6095184 A | 5/1985 | | F02M 39/00 |
| JP | 2010249006 A | 11/2010 | | F02M 59/26 |
| WO | 2015/052289 A1 | 4/2015 | | F02M 53/00 |

OTHER PUBLICATIONS

Chinese Office Action, Application No. 201480007089.2, 14 pages, Jul. 5, 2016.

* cited by examiner

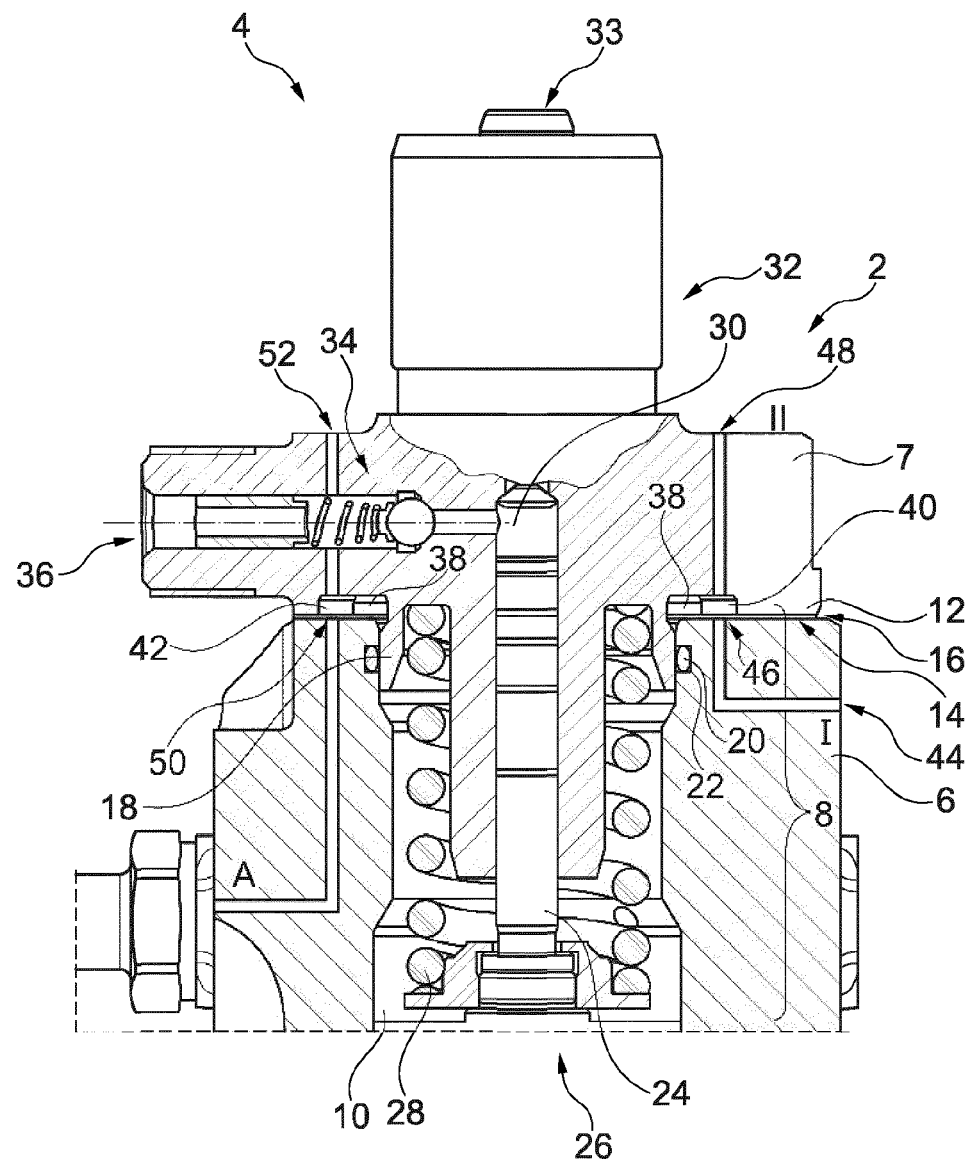

PLUG-IN PUMP FOR A COMMON-RAIL SYSTEM AND ENGINE ARRANGEMENT HAVING AN INTERNAL COMBUSTION ENGINE, HAVING A COMMON-RAIL SYSTEM AND HAVING A PLUG-IN PUMP

CROSS-REFERENCE TO RELATED APPLICATIONS

This application is a U.S. National Stage Application of International Application No. PCT/EP2014/071676 filed Oct. 9, 2014, which designates the United States of America, and claims priority to DE Application No. 10 2013 220 600.3 filed Oct. 11, 2013, the contents of which are hereby incorporated by reference in their entirety.

TECHNICAL FIELD

Pressure accumulator-assisted injection systems for internal combustion engines, in particular diesel engines, require a piston pump with a piston which is guided in a cylinder in a sealed-off manner in order to provide the very high fuel pressure of possibly greater than 2000 bar. The piston can be moved in an alternating manner by an eccentric, wherein the eccentric is coupled to the internal combustion engine which is supplied with fuel by the injection system. For the purpose of particularly compact integration, it is known to design axial piston pumps of this kind as "plug-in pumps" which can be inserted into an opening in an engine component and there can be screwed to the engine component.

BACKGROUND

The application of fuel with a high pressure leads to the development of heat in the plug-in pump, in particular in the region of the piston and of the cylinder in which the piston moves. Discharge of the heat can be made more difficult by the input of heat from the internal combustion engine.

SUMMARY

One embodiment provides a plug-in pump for a common-rail system having a pump housing with a cylinder formed therein, with a piston guided therein, and with a fuel inlet, and a fuel outlet, wherein the pump housing further has a plug-in section for inserting the pump housing into an opening in an engine component and has a flange, which delimits the plug-in section, for fastening the pump housing to the engine component, wherein the pump housing has at least one flow duct with a separate fluid inlet and a separate fluid outlet, and wherein the fluid inlet can be connected to a fluid-discharging line of the internal combustion engine, and the fluid outlet can be connected to a fluid-receiving line of the internal combustion engine.

In a further embodiment, the fluid inlet has a hole which is arranged in a region which is averted from the flange and which can be connected to a connection structure.

In a further embodiment, the fluid outlet is a hole which is arranged in a region which is averted from the flange and which can be connected to a connection structure.

In a further embodiment, the flow duct has an at least partially circumferential groove which can be sealed off by a circumferential seal over the flange on the engine component.

In a further embodiment, a first fluid connection is arranged in a connecting region on the engine component, said first liquid connection being in alignment with a fluid inlet on the flange when the plug-in pump is mounted on the engine component.

In a further embodiment, a second fluid connection is arranged in a connecting region on the engine component, said second fluid connection being in alignment with a fluid outlet on the flange when the plug-in pump is mounted on the engine component.

Another embodiment provides an engine arrangement having an internal combustion engine and a common-rail system having a plug-in pump as described above, wherein the fluid inlet is connected to a fluid-discharging line, and the fluid outlet is connected to a fluid-receiving line of the internal combustion engine.

In a further embodiment, the fluid-discharging line and the fluid-receiving line are constituent parts of a cooling circuit of the engine.

In a further embodiment, the fluid-discharging line and the fluid-receiving line are constituent parts of an oil circuit of the engine.

Another embodiment is directed to the use of a cooling or oil circuit of an internal combustion engine having a common-rail system for cooling a plug-in pump of the common-rail system by means of a flow duct which is integrated in the plug-in pump.

BRIEF DESCRIPTION OF THE DRAWINGS

Example embodiments are discussed below with reference to the FIGURE, which shows a sectional illustration of an example plug-in pump.

DETAILED DESCRIPTION

Embodiments of the invention provide a plug-in pump for a common-rail system, which plug-in pump allows heat to be discharged in as reliable and sufficient a manner as possible for long-term operation.

One embodiment provides a common-rail system which has a pump housing with a cylinder formed therein, with a piston guided therein and with a fuel inlet, and a fuel outlet, wherein the pump housing further has a plug-in section for inserting the pump housing into an opening in an engine component and has a flange, which delimits the plug-in section, for fastening the pump housing to the engine component. The plug-in pump is distinguished in that the pump housing has at least one fluid duct with a separate fluid inlet and a separate fluid outlet, wherein the fluid inlet can be connected to a fluid-discharging line of the internal combustion engine, and the fluid outlet can be connected to a fluid-receiving line of the internal combustion engine.

Thus, embodiments provide a plug-in pump such that is actively cooled by actively introducing a fluid. A fluid with a lower temperature level than that of the pump housing during operation can be conducted through the pump housing through the flow duct. Connection of the separate fluid inlet and of the separate fluid outlet to a fluid-discharging line and a fluid-receiving line leads to, in particular, a cooling water circuit or an oil circuit, which is likewise subjected to cooling, of the internal combustion engine being coupled to the plug-in pump, so that the pump can then precisely transfer heat to a heat sink when the internal combustion engine and therefore also the plug-in pump itself are operated. The used fluid, or the fluid-receiving line and the fluid-discharging line, can be designed either as connections to a coolant line of a coolant circuit or of an oil circuit.

The flow duct in the pump housing is to be understood to be a recess which extends in a linear manner at least in regions and through which the fluid can flow. The flow duct can be produced by multipartite design of the pump housing, by casting methods, erosion methods or, as stated further below, by arrangement of an annular groove which can be sealed off.

The fluid inlet can be a hole which can be connected to a connection means, for example a nipple, and is located on an outer side of a section of the pump housing which is averted from the flange. There, the fluid inlet extends in the direction of the flow duct. The fluid inlet can be a hole with an internal thread into which a screw nipple with an external thread can be screwed and can preferably be sealed off by means of a seal. On account of the relatively low pressure of the fluid stream in the flow duct in comparison to the pressures of the fuel stream which is conveyed through the plug-in pump, considerably lower demands can be made of the mechanical properties of the inlet than for the actual fuel outlet. The means for receiving a line can comprise pipe ends with concave portions, shoulders or the like onto which, for example, a flexible line can be plugged and secured.

The fluid outlet can likewise be a hole which can be connected to a connection means, for example to a nipple, and is located on an outer side of a section of the pump housing which is averted from the flange. The fluid outlet extends in the direction of the flow duct here too. The fluid flowing through said flow duct therefore moves from the fluid inlet to the fluid outlet, where it returns to the original fluid circuit via connection means, for example via flexible fluid lines.

In one embodiment, the flange has an at least partially circumferential groove which can be sealed off by means of a circumferential seal over the flange on the engine component and, in the mounted state of the plug-in pump, forms the flow duct. A flow duct of this kind is particularly easy to manufacture since only an at least partially circumferential groove has to be made in the flange. The groove is particularly preferably fully circumferential, so that an inflow region and an outflow region can be defined, for example, at two points of the resulting annular duct which are offset through 180°, it being possible for said inflow region and outflow region to be connected to the fluid inlet and, respectively, to the fluid outlet.

In one embodiment, a first fluid connection is arranged in a connecting region on the engine component, said first liquid connection being in alignment with a fluid inlet on the flange when the pump is mounted. In this case, the fluid inlet can be designed as an inflow region of the annular groove. An external line and the connection means by means of which the fluid is transported to the fluid inlet can therefore be saved.

In another embodiment, the engine component can have a second fluid connection in a connecting region, said second fluid connection being positioned in such a way that it is in alignment with a fluid outlet on the flange. Therefore, an external line and a connection means can likewise be saved. Furthermore, it is particularly advantageous for the cooling effect due to the fluid flowing through to also be able to extend into a region of the engine component which is close to the pump or close to the flange, this in turn further reducing the input of heat by the engine component into the pump and therefore still further improving the cooling effect.

It is also possible to provide a flange-side fluid inlet for the flow duct, said flange-side fluid inlet being combined with a fluid outlet, which is at a distance from the flange, for an external discharge line. Equally, a fluid inlet which is at a distance from the flange can be combined with a flange-side fluid outlet.

The operation of a pump of this kind is considerably improved by the active cooling, and therefore components can be effectively protected against an increase in temperature, this improving, in particular, the integrity of seals which are composed of polymeric materials. Furthermore, when the fuel is compressed, no bubbles are formed and the fuel is not cracked.

Other embodiments provide an engine arrangement having a common-rail system which has a plug-in pump of the kind described above, wherein the fluid inlet is connected to a fluid-discharging line, and the fluid outlet is connected to a fluid-receiving line of the internal combustion engine. The fluid-discharging line and the fluid-receiving line are, for example, constituent parts of a cooling circuit or of an oil circuit.

Other embodiments relate to the use of a cooling or oil circuit of an internal combustion engine having a common-rail system for cooling a plug-in pump of the common-rail system by means of a flow duct which is integrated in the plug-in pump.

The FIGURE shows one embodiment of a plug-in pump 2 in an engine arrangement 4 which, in addition to the plug-in pump 2, also comprises an engine component 6 which is, for example, an engine block or a part of an engine block.

The plug-in pump 2 has a housing 7 with a plug-in section 8 which can be inserted into an opening 10 in the engine component 6. The plug-in section 8 is delimited by a flange 12 which, when the plug-in pump 2 is inserted, rests on a support face 14 of the engine component 6 and there is sealed off by means of a sealing disk 16.

An annular projection 18 which faces the opening 10 and centers the pump 2 in the opening 10 is located at the edge of the flange of the plug-in pump 2. The contact faces between the projection 18 and the opening 10 are sealed off by means of a sealing ring 20 which is mounted in a channel 22 in the opening 10.

An axial piston 24 is moved in the interior of the plug-in pump 2 in an alternating manner in relation to a pump chamber 30 against the restoring force of a spring 28 by means of an eccentric arrangement 26 which is only partially illustrated in the FIGURE. A flow valve 32, which controls the inflow of fuel from a fuel inlet 33 to the plug-in pump 2, is located in an extension of the longitudinal axis of the piston 24. An outlet valve 34 through which the pressurized fuel is conveyed to a fuel outlet 36 laterally adjoins the pump chamber 30.

The pump 2 can be subjected to the input of a high level of heat owing to the continuous pumping of the fuel and also owing to the heat which is present at the engine component 6. In order to discharge said heat, the plug-in pump 2 is integrated into the active cooling of the internal combustion engine by means of the engine arrangement 4, said internal combustion engine being supplied with fuel by the plug-in pump by means of a common-rail system. A flow duct 38 through which a fluid can be conveyed, which fluid enters the flow duct 38 through an inflow region 40, can be provided for this purpose. The fluid can further leave the flow duct 38 again by means of an outflow region 42.

In the case shown, the flow duct 38 is designed as an annular groove which extends over the entire circumference of the edge-side raised portion 18 and can be produced, for example, by means of untwisting or over-twisting. The inflow region 40 and the outflow region 42 can be guided out of the flow duct 38 to the outside as a radial extent or as a pocket to which a connection is made by means of a connecting hole or directly by means of the flange 12.

When fluid flows through the flow duct 38, flow division can be expected given a symmetrical design of the flow duct 38, so that in each case half of the fluid stream flows around the plug-in section 38 in the clockwise direction and, respectively, half in the counterclockwise direction.

The possible connections with which the fluid is introduced into or discharged from the flow channel 38 are only schematically shown. An option I in which inflow through the engine component 6 takes place, wherein said engine component then has a corresponding fluid inlet 44, is shown on the right-hand side in the plane of the drawing. A fluid connection 46 in the support face 14, which fluid connection is brought into alignment with the inflow region 40 of the plug-in pump 2, can be realized by means of one or more connecting holes or the like. In this case, the inflow region 40 forms the actual fluid inlet of the plug-in pump 2.

In an alternative option II, inflow by means of the housing 7 of the plug-in pump 2 would be possible, in the case of which, for example, a fluid inlet 48 is arranged on a side of the flange 12 of the plug-in pump 2, which side is situated opposite the support face 14 and is connected to the inflow region 40 by means of a corresponding flow duct. The fluid inlet 48 could establish a connection to a flexible fluid line, for example, by means of a screw nipple.

A fluid outlet or the discharge of the fluid could furthermore likewise be realized by means of two different alternative options A and B. Whereas a fluid connection 50 can run in the interior of the engine component 6 in option A, analogously to I, a fluid outlet 52 according to option B could be connected to a connection means. The fluid outlet is only schematically shown and does not have to be arranged in the vicinity of the outlet 36, in order to not weaken the material there.

All fluids which have a lower temperature level than the plug-in pump 2 and the engine component 6 are suitable for cooling the pump 2. Coolants which are mostly based on water and have different additives, in particular for preventing frost damage, are preferred. However, it would also be feasible to cool the plug-in pump 2 by means of an oil circuit which is likewise subject to active cooling.

The input of heat from the plug-in pump 2 to the respective fluid is very low in comparison to the internal combustion engine and would have virtually no influence on the cooling of said fluid. Nevertheless, very effective active cooling of the plug-in pump 2 could take place therewith, this leading to possible further compacting of a plug-in pump of this kind and being able to very reliably prevent several disadvantages. Said disadvantages include, for example, the formation of vapor bubbles in fuel or cracking of fuel within the pump.

It should further be noted that supply and discharge of the fluid in question can also take place in a combined manner by means of the alternatives I and A, I and B, II and A or II and B.

Even though the present invention has been described with reference to preferred exemplary embodiments above, it is not limited to said exemplary embodiments, but rather can be modified in a wide variety of ways. In particular, the invention can be changed or modified in a wide variety of ways, without departing from the essence of the invention.

LIST OF REFERENCE SYMBOLS

2 Plug-in pump
4 Engine arrangement
6 Engine component
7 Housing
8 Plug-in section
10 Opening
12 Flange
14 Support face
16 Sealing disk
18 Projection
20 Sealing ring
22 Channel
24 Axial piston
26 Eccentric arrangement
28 Spring
30 Pump chamber
32 Flow valve
33 Fuel inlet
34 Outlet valve
36 Fuel outlet 36
38 Flow duct
40 Inflow region
42 Outflow region
44 Fluid inlet
46 Fluid connection
48 Fluid inlet
50 Fluid connection
52 Fluid outlet
I Option: inflow by means of engine component 6
II Option: inflow by means of housing 7
A Option: discharge by means of engine component 6
B Option: discharge by means of housing 7

What is claimed is:

1. A plug-in pump for a common-rail system, the plug-in pump comprising:
    a pump housing having a cylinder formed therein,
    a piston guided in the cylinder,
    a fuel inlet, and
    a fuel outlet,
    wherein the pump housing further includes:
    a plug-in section configured to be inserted into an opening in an engine component, and
    a flange that delimits the insertion of the plug-in section into the opening in the engine component,
    at least one flow duct having a flow duct fluid inlet and a flow duct fluid outlet,
    wherein the flow duct fluid inlet is configured for connection to a fluid-discharging line of the internal combustion engine and the fluid outlet is configured for connection to a fluid-receiving line of the internal combustion engine; and
    a first fluid connection of the fluid-discharging line in a connecting region on the engine component,
    wherein the fluid inlet is disposed on the flange and aligned to the first fluid connection when the plug-in pump is mounted on the engine component.

2. The plug-in pump of claim 1, wherein the fluid inlet has a hole which is arranged in a region which is averted from the flange and which can be connected to a connection structure.

3. The plug-in pump of claim 1, wherein the fluid outlet is a hole which is arranged in a region which is averted from the flange and which can be connected to a connection structure.

4. The plug-in pump of claim 1, wherein the flow duct has an at least partially circumferential groove which can be sealed off by a circumferential seal over the flange on the engine component.

5. The plug-in pump of claim 1, wherein a second fluid connection is arranged in a connecting region on the engine component, said second fluid connection being in alignment with a fluid outlet on the flange when the plug-in pump is mounted on the engine component.

6. An engine arrangement, comprising:
an internal combustion engine, and
a common-rail system, comprising:
a plug-in pump comprising:
a pump housing having a cylinder formed therein,
a piston guided in the cylinder,
a fuel inlet, and
a fuel outlet,
wherein the pump housing further includes:
a plug-in section configured to be inserted into an opening in an engine component, and
a flange that delimits the insertion of the plug-in section into the opening in the engine component,
at least one flow duct having:
a flow duct fluid inlet connected to a fluid-discharging line of the internal combustion engine, and
a flow duct fluid outlet connected to a fluid-receiving line of the internal combustion engine; and
a first fluid connection of the fluid-discharging line in a connecting region on the engine component,
wherein the fluid inlet is disposed on the flange and aligned to the first fluid connection when the plug-in pump is mounted on the engine component.

7. The engine arrangement of claim 6, wherein the fluid-discharging line and the fluid-receiving line are constituent parts of a cooling circuit of the engine.

8. The engine arrangement of claim 6, wherein the fluid-discharging line and the fluid-receiving line are components of an oil circuit of the internal combustion engine.

9. The engine arrangement of claim 6, wherein the fluid inlet has a hole which is arranged in a region which is averted from the flange and which can be connected to a connection structure.

10. The engine arrangement of claim 6, wherein the fluid outlet is a hole which is arranged in a region which is averted from the flange and which can be connected to a connection structure.

11. The engine arrangement of claim 6, wherein the flow duct has an at least partially circumferential groove which can be sealed off by a circumferential seal over the flange on the engine component.

12. The engine arrangement of claim 6, wherein a second fluid connection is arranged in a connecting region on the engine component, said second fluid connection being in alignment with a fluid outlet on the flange when the plug-in pump is mounted on the engine component.

* * * * *